(12) United States Patent
Chang

(10) Patent No.: US 6,756,439 B2
(45) Date of Patent: Jun. 29, 2004

(54) FILLED WEATHERABLE COMPOSITIONS HAVING A GOOD SURFACE APPEARANCE

(75) Inventor: Moh-Ching Oliver Chang, Wexford, PA (US)

(73) Assignee: Bayer Polymers LLC, Pittsburgh, PA (US)

( * ) Notice: Subject to any disclaimer, the term of this patent is extended or adjusted under 35 U.S.C. 154(b) by 112 days.

(21) Appl. No.: 10/103,028

(22) Filed: Mar. 21, 2002

(65) Prior Publication Data

US 2003/0181581 A1 Sep. 25, 2003

(51) Int. Cl.$^7$ .............................. C08L 77/00; C08K 3/40
(52) U.S. Cl. ..................... 524/494; 524/456; 524/493
(58) Field of Search ................................ 524/494, 493, 524/456

(56) References Cited

U.S. PATENT DOCUMENTS

| | | | |
|---|---|---|---|
| 4,205,141 A | 5/1980 | Liebig et al. | 525/67 |
| 5,039,719 A | 8/1991 | Watanabe et al. | 523/213 |
| 5,071,910 A | * 12/1991 | Schepers et al. | 525/66 |
| 5,304,591 A | 4/1994 | Nowakowsky et al. | 524/494 |
| 5,811,491 A | 9/1998 | Jagawa et al. | 525/71 |

FOREIGN PATENT DOCUMENTS

EP 0 468 462 1/1992

OTHER PUBLICATIONS

Patent Abstracts Of Japan, vol. 015, No. 385 (C–0871), Sep. 27, 1991 & JP 03 153751 A (Mitsubishi Rayon Co Ltd), Jul. 1, 1991 WPI and PAG abstracts.

* cited by examiner

Primary Examiner—Ana Woodward
(74) Attorney, Agent, or Firm—Joseph C. Gil; Aron Preis

(57) ABSTRACT

A glass fiber reinforced thermoplastic molding composition suitable for the preparation of articles having good surface properties is disclosed. The composition contains a resinous blend and a filler component. The resinous blend contains (i) to 50 wt. % of a grafted acrylate rubber, (ii) 2 to 10 wt. % of a first copolymer containing structural units derived from styrene (meth)acrylonitrile and maleic anhydride, (iii) 20 to 80 wt. % polyamide, and (iv) 0 to 40 wt. % of a second copolymer containing structural units derived from styrene and (meth)acrylonitrile, the percents being relative to the total amount of (i), (ii), (iii) and (iv). The filler component of the inventive composition contains 5 to 50 percent of milled glass fibers, the percent being relative to the weight of the molding composition. Optionally, the inventive composition also contains a positive amount of a wollastonite. Molded articles that are prepared of the composition feature good mechanical properties and excellent surface quality.

8 Claims, No Drawings

US 6,756,439 B2

FILLED WEATHERABLE COMPOSITIONS HAVING A GOOD SURFACE APPEARANCE

FIELD OF THE INVENTION

The invention relates to glass fiber-reinforced thermoplastic compositions; in particular, the invention relates to compositions containing grafted acrylate rubber and polyamide that are suitable for molding articles having good surface quality.

SUMMARY OF THE INVENTION

A glass fiber reinforced thermoplastic molding composition suitable for the preparation of articles having good surface properties is disclosed.

The composition contains a resinous blend and a filler component. The resinous blend contains (i) 20 to 50 wt. % of a grafted acrylate rubber, (ii) 2 to 10 wt. % of a first copolymer containing structural units derived from styrene (meth)acrylonitrile and maleic anhydride, (iii) 20 to 80 wt. % polyamide, and (iv) 0 to 40 wt. % of a second copolymer containing structural units derived from styrene and (meth) acrylonitrile, the percents being relative to the total amount of (i), (ii), (iii) and (iv). The filler component of the inventive composition contains 5 to 50 percent of milled glass fibers, the percent being relative to the weight of the molding composition. Optionally, the inventive composition also contains a positive amount of a wollastonite. Molded articles that are prepared of the composition feature good mechanical properties and excellent surface quality.

DETAILED DESCRIPTION OF THE INVENTION

The thermoplastic molding composition of the present invention contains a resinous blend and a filler component. The resinous blend contains (i) 20 to 50, preferably 25 to 45 percent by weight of a grafted acrylate rubber (herein referred to as ASA), (ii) 2 to 10, preferably 4 to 8 percent by weight of a first copolymer having a weight average molecular weight of 60,000 to 180,000, preferably 100,000 to 140,000 g/mole and containing structural units derived from styrene (including substituted styrene wherein substituents are halogens or alkyl groups, as well as alpha methyl styrene), (meth)acrylonitrile and maleic anhydride, and (iii) 20 to 80, preferably 25 to 60 percent by weight of polyamide.

(iv) 0 to 40, preferably 5 to 25 percent by weight of a second copolymer having a weight average molecular weight of 70,000 to 200,000, preferably 105,000 to 155,000 g/mole, the structure of which contains units derived solely from styrene and (meth)acrylonitrile.

The filler component of the inventive composition contains 5 to 50, preferably 20 to 40 percent of milled glass fibers having an average length of about ⅟64" to ⅟16", said percent being relative to the weight of the molding composition.

Optionally, the inventive composition may further contain a positive amount of up to 25 percent by weight, preferably up to 22 percent (relative to the weight of the molding composition) of wollastonite, in the form of particles having an average length of 20 to 300, preferably 40 to 200 microns and particle diameter of 2 to 20, preferably 3 to 10 microns.

The ASA Resin

Component (a), the ASA resin (acrylate-styrene-acrylonitrile interpolymer), is known as an impact-modified, substantially thermoplastic resin which comprises a SAN matrix in which is dispersed an acrylate elastomer phase as impact modifier. Advantageous ASA resins which are commercially available comprise a crosslinked (meth)acrylate elastomer, a crosslinked SAN copolymer and a substantially linear SAN copolymer. Methylated styrenes such as α-methyl styrene or vinyl toluene may be used in place of all or part of the styrene.

The ASA resins may be prepared by a variety of known methods involving emulsion or bulk polymerization. The preferred ASA resins are of core-shell structure; these structures are well known in the art and have been disclosed in, among others U.S. Pat. No. 3,944,631 that is incorporated herein by reference. The (meth)acrylate elastomer core portion of these resins may be composed of alkyl, aryl, or arylalkyl esters of acrylic or methacrylic acids. These may be prepared by a two-step process in which the (meth) acrylate elastomer core (which may by at least partially crosslinked, such as by the known incorporation of polyfunctional vinyl compounds) is covered with a thermoplastic shell of polymethyl methacrylate, polystyrene, styrene-acrylonitrile copolymer, or similar vinyl (co)polymers.

Other ASA resins which may be advantageously used in the composition of the invention are the types disclosed in U.S. Pat. Nos. 3,655,824; 3,830,878; 3,991,009; 4,433,102; 4,442,263; and 4,409,363, all of which are incorporated herein by reference. These ASA resins are thermoplastic resins that are typically made of an acrylate ester, styrene (or α-methylstyrene), and acrylonitrile. These resins exhibit good impact, heat distortion and weathering characteristics.

The ASA component of the inventive composition is present in an amount of 20 to 50, preferably 25 to 45 percent by weight relative to the weight of the resinous blend.

The First Copolymer

The first copolymer, having weight average molecular weight of 60,000 to 180,000, preferably 100,000 to 140,000 g/mole, contains structural units derived from styrene (including substituted (α-methyl)styrene wherein substituents are halogens or alkyl groups), (meth)acrylonitrile and maleic anhydride.

Structurally, the first copolymer contain 50 to 90, preferably 60 to 80 wt. percent of units derived from styrene, 10 to 50, preferably 20 to 40 wt. percent of units derived from (meth)acrylonitrile and 0.2 to 30, preferably 0.5 to 5 wt. percent of units derived from maleic anhydride, the wt. percents being relative to the weight amount of the named structural components of the first copolymer. The preparation of the first copolymer is conventional.

The first copolymer is present in the inventive composition in an amount of 2 to 10, preferably 4 to 8 percent by weight relative to the weight of the resinous blend.

The Polyamide Resin

The polyamide resins used in the blends of this invention are well known in the art and embrace semi-crystalline and amorphous resins having a molecular weight of at least 5000 and commonly referred to as nylons. Suitable polyamides include those described in U.S. Pat. Nos. 2,071,250; 2,071, 251; 2,130,523; 2,130,948; 2,241,322; 2,312,966; 2,512, 606; 3,393,210; 2,071,250; 2,071,251; 2,130,523; 2,130, 948; 2,241,322; 2,312,966; and 2,512,606; all incorporated herein by reference.

The polyamide resin may be produced by condensation of equimolar amounts of a saturated dicarboxylic acid containing from 4 to 12 carbon atoms with a diamine, in which the diamine contains from 4 to 14 carbon atoms. Excess diamine can be employed to provide an excess of amine end groups over carboxyl end groups in the polyamide. Examples of polyamides include polyhexamethylene adipamide (66 nylon), polyhexamethylene azelaamide (69 nylon), polyhexamethylene sebacamide (610 nylon), and polyhexamethylene dodecanoamide (612 nylon), the polyamide produced by ring opening of lactams, i.e., polycaprolactam, polylauric lactam, poly-11-amino-undecanoic acid, bis (paraaminocyclohexyl) methane dodecanoamide. It is also possible to use in this invention polyamides prepared by the copolymerization of two of the above polymers or terpolymerization of the above polymers on their components, e.g., an adipic, isophthalic acid hexamethylene diamine copolymer. Preferably, the polyamides are linear with a melting point in excess of 200 degree °C. The term "nylon" as used herein refers to nylon containing conventional compounding ingredients as are known to those skilled in the art. Examples of the polyamide resin are Nylon 4, Nylon 6, Nylon 7, Nylon 8, Nylon 9, Nylon 11, Nylon 12, Nylon 66, Nylon 610, etc. These polyamide resins may be used alone or in combination.

The polyamide component of the inventive composition is present in an amount of 20 to 80, preferably 25 to 60 percent relative to the weight of the resinous blend.

The Second Copolymer

The second copolymer, having weight average molecular weight of 70,000 to 200,000, preferably 105,000 to 155,000 g/mole, the structure of which contains units derived solely from styrene and (meth)acrylonitrile wherein the structural units derived from styrene amount to about 55 to 85% and the units derived from acrylonitrile amount to 15 to 45%, the percents being relative to the total weight of the named structural components of the second copolymer. The preparation of the second copolymer is conventional.

The second copolymer is present in the inventive composition in an amount of 0 to 40, preferably 5 to 25 percent by weight relative to the weight of the resinous blend.

The Filler Component

The filler component is present in the inventive composition in an amount of 5 to 50, preferably 20 to 40 percent relative to the weight of the molding composition. The filler is essentially milled glass fibers, that is glass fibers having an average length of about 1/64" to 1/16". In an additional embodiment of the invention the filler is a mixture of milled glass fibers with wollastonite.

Milled Glass Fibers

Milled glass fibers have been widely used as a filler for polymeric systems, see, for instance, U.S. Pat. Nos. 4,381,352, 4,680,214, and 4,861,803. The standard milled glass fiber used in the industry has a diameter of about 16 micrometers and average length of about 1/64" to 1/16". More information relative to the milled glass fibers has been disclosed in S. H. Metzger, Jr. and K. Seel, "High Modulus RIM Elastomers for Automotive Extedor Body Panels" in J. Cell. Plastics, 268–273 (1981) and in U.S. Pat. No. 4,381,352, both incorporated herein by reference. The length of a glass fiber can be expressed in various ways, such as average fiber length or as bulk density. For example, the average length of a "1/16-inch" milled glass fiber is about 0.006 inches (0.253 mm) and the bulk density of such a fiber is about 0.500 g/cm$^3$. It has now been found that milled glass fiber, having a diameter of 10 to 20 micrometers provides unexpected advantages when used as a filler for the inventive composition.

The inventive composition contains 5 to 50, preferably 20 to 40 percent of milled glass fibers the percent being relative to the weight of the molding composition.

The Optional Component

Characterized in terms of the physical dimensions of its particles, the median diameter ($D_{50}$) of the optional wollastonite component in the context of the present invention is about 2 to 20, preferably 3 to 10, most preferably 4 to 10 microns and its length is about 20 to 300, preferably 30 to 250, most preferably 40 to 200 microns. The median diameter of the wollastonite, is determined as equivalent spherical diameter by Sedigraph (X-ray). The length (volume-weighted mean) is determined microscopically by image analysis. The amount of the optional wollastonite in the inventive composition is a positive amount of up to 25 percent, preferably up to 22 percent (the percents being relative to the weight of the molding composition).

Other additives known in the art for their art recognized function may also be included in the inventive composition in functional amounts. These include flame retarding agents, mold release agents, lubricants and stabilizers, including thermal, hydrolytic and UV stabilizers as well as dyes and pigments.

The inventive composition offers distinct advantages over corresponding compositions that contain chopped glass fibers or wollastonite or a combination of chopped glass fibers and wollastonite. The surface properties of the instant compositions are surprisingly and unexpectedly improved there over.

The preparation of the inventive composition is conventional and may be carried out by following procedures and using equipment that are well known to the art-skilled.

The invention will be better understood with reference to the following examples, which are presented for purposes of illustration rather than for limitation, and which set forth the best mode contemplated for carrying out the invention.

EXAMPLES

Compositions in accordance with the invention and comparative examples were prepared and their properties determined; a summary of the tested properties is presented in the table below. In additional to the components indicated below, each of the compositions further contained identical amounts of additives including an antioxidant, light absorber, light stabilizer and pigments, which have no criticality in the present context.

The surface appearance of the articles molded of the compositions was evaluated by visual inspection and determined in relation to the presence/absence of smudges, and streaks and locals of non-uniform color. In the evaluations reported below, the composition contained black pigment because surface defects are more noticeable.

Comparative Examples

The table below shows the results of corresponding compositions that are not within the scope of the invention, all based on ASA and containing the glass fibers of the present invention.

The compounding of the compositions and the molding of test specimens were carried out following the procedures summarized below:

| Compounding | |
| --- | --- |
| Extruder: | ZSK 30-mm twin-screw extruder |
| Melt Temperature: | Set at: 200, 240, 270, 280, 285, 250 degree C. Zone-1, 2, 3, 4, 5 and die, respectively |
| Screw Speed: | 300 rpm |
| Injection Molding | |
| Molding Machine: | New Britain 200-Ton |
| Melt Temperature: | Set at: 500, 500, 500, 500 degree F. for Zone-1, 2, 3 and nozzle, respectively |
| Mold Temperature: | Set at: 180 degree F. |

The compositions that were tested and which properties are summarized below were identical in terms of the compositional makeup of their resinous components and additives.

The resinous content of each of the compositions contained 35.0 wt. % of a rubber having bimodal particle size distribution of average particle size 0.4 microns and 0.15 microns. Both modes comprise styrene-acrylonitrile copolymer grafted on a core-sell structured rubber substrate.

The core contained styrene and the shell is crosslinked polybutylacrylate 6.0 wt. % of a copolymer of styrene, acrylonitrile, and maleic anhydride (the molar amounts of the respective components were 66.5/32.5/1%; the weight-average molecular weight of the copolymer was 115,000 g/mole).

44 wt. % of a polyamide 6 having relative viscosity molecular weight of 48 (formic acid) determined in accordance with ASTM D789.

15.0 wt. % of a copolymer of styrene-acrylonitrile of 67.5 wt. % and 32.5 wt. %, respectively, and weight-average molecular weight of 133,000 k/mole.

Each of the compositions contained:
octadecyl-3,5-di-tert-butyl-4-hydroxy-hydrocinnamate—an antioxidant—1 pphr (parts per one hundred weight of resin); disteraryl thiodipropionate—an antioxidant—0.5 pphr; 2-(2'-hydroxy-3',5'-di-tert-amyl phenyl)benzotriazole— light absorber—0.25 pphr; bis(2,2,6,6,-tetramethyl-4-piperidinyl)sebacate—light stabilizer—0.25 pphr and N,N'-hexamethylene bis[3-(3,5-di-t-butyl-4-hydroxyphenyl) propionamide]—0.25 pphr. Also included in each was 4.3 pphr of a color concentrate containing carbon black (25% relative to the weight of the concentrate) and 75 wt % SAN copolymer (wt. 31% Acrylonitrile). None of these added components is believed to have criticality in the present context.

| (weight percentage relative to the molding composition) | C-1 | C-2 | C-3 | C-4 | Exp-1 | Exp-2 | Exp-3 | Exp-4 | Exp-5 | Exp-6 |
|---|---|---|---|---|---|---|---|---|---|---|
| chopped glass fibers, ⅛"[1] | 30.0 | | | 15.0 | | | | | | |
| Wollastonite, 8 $\mu m^2$ | | 30.0 | | | | | | | | |
| Wollastonite, 5 $\mu m^3$ | | | 30.0 | 15.0 | | | | 15.0 | 15.0 | 15.0 |
| milled glass fibers, ⅟₁₆"[4] | | | | | 30.0 | | | 15.0 | | |
| milled glass fibers, ⅟₃₂"[5] | | | | | | 30.0 | | | 15.0 | |
| milled glass fibers, ⅟₆₄"[6] | | | | | | | 30.0 | | | 15.0 |
| Surface quality[a] | 3 | 4 | 5 | 5 | 1 | 1 | 1 | 1 | 1 | 1 |
| Viscosity (1000 1/s, 260° C.) Pa-S | 294 | 276 | 295 | 303 | 269 | 285 | 290 | 278 | 268 | 288 |
| Vicat[7] (1 Kg), ° C. | 205 | 198 | 196 | 203 | 198 | 191 | 195 | 199 | 198 | 195 |
| Vicat (5 Kg), ° C. | 124 | 115 | 116 | 125 | 114 | 116 | 114 | 116 | 116 | 114 |
| DTUL[8], 66 psi (0.46 MPa), ° C. | 192 | 137 | 131 | 183 | 145 | 125 | 103 | 148 | 137 | 105 |
| DTUL, 264 psi (1.8 MPa), ° C. | 104 | 89 | 90 | 102 | 91 | 90 | 81 | 90 | 89 | 83 |
| Izod[9] (⅛" at RT[10]), ft-lb/in | 2.1 | 1.0 | 0.8 | 1.0 | 1.4 | 1.2 | 1.0 | 0.8 | 0.8 | 0.7 |
| Izod (⅛" at −30° C.), ft-lb/in | 1.3 | 0.7 | 0.7 | 0.7 | 0.7 | 0.6 | 0.6 | 0.7 | 0.6 | 0.7 |
| Izod (¼" at RT), ft-lb/in | 2.1 | 0.8 | 0.8 | 1.1 | 1.3 | 1.2 | 0.9 | 0.9 | 0.9 | 0.8 |
| Izod (¼" at −30° C.), ft-lb/in | 1.2 | 0.6 | 0.7 | 0.7 | 0.7 | 0.6 | 0.6 | 0.6 | 0.6 | 0.6 |
| Flexural[11] strength at yield, psi | 23780 | 14300 | 14650 | 18420 | 13990 | 14650 | 12720 | 13720 | 14500 | 13125 |
| Flexural Modulus × 10-5, psi | 9.4 | 7.1 | 7.2 | 9.2 | 6.4 | 6.4 | 4.9 | 6.2 | 6.6 | 5.4 |
| Tensile[10] strength at yield, psi | no yield | 7860 | 7975 | no yield | 7860 | 8110 | 6920 | 7640 | 7975 | 7250 |
| Tensile strength at failure, psi | 13830 | 7135 | 7350 | 10470 | 7395 | 7760 | 6470 | 7280 | 7700 | 6760 |
| Elongation at failure, % | 4.4 | 10.0 | 9.7 | 3.1 | 5.3 | 5.0 | 7.1 | 6.4 | 7.1 | 12.0 |
| Tensile modulus × 10-5, psi | 11.9 | 9.5 | 9.8 | 11.8 | 8.3 | 8.4 | 7.0 | 8.3 | 8.3 | 7.3 |

[a]Visual evaluation of six different textures (differing in terms of their respective roughness) and ranking the surface quality from "good" (1) to "poor" (5). The base line for the visual ranking is that of an unfilled-ASA, the ranking of which is 1.
[1]chopped glass fibers having average length of ⅛" and an average filament diameter of 10 micrometers, PPG 3540.
[2]Wollastonite, average particle size of 8 micrometers, a product of Nyco.
[3]Wollastonite, average particle size of 5 micrometers, a product of Nyco.
[4]Milled glass fiber, average length ⅟₁₆" and average filament diameter of 15.8 micrometers, a product of Owens Corning.
[5]Milled glass fiber, average length ⅟₃₂" and average filament diameter of 15.8 micrometers, a product of Owens Corning.
[6]Milled glass fiber, average length ⅟₆₄" and average filament diameter of 15.8 micrometers, a product of Owens Corning.
[7]Vicat refers to refers to ASTM D1525, with the indicated applied load. The temperature of the oil increased at a rate of 2 degree C./min.
[8]DTUL refers to ASTM D648, with the indicated applied load. The temperature of the oil increased at a rate of 2 degree C./minute.
[9]Izod refers to ASTM D256, at the indicated temperature (RT refers to room temperature). The samples measured 6.35 cm × 1.27 cm × indicated thickness. The test specimens were milled with a 0.25 cm. radius notch at midpoint to a remaining height of 10.2 m.
[10]The tensile properties were run at room temperature using an Instron Univeral Machine with cross-head speed of 5 mm/minute in accordance with ASTM D-638. Type I tensile bars.
[11]Flexural properties were run at room temperature using an Instron Univeral Machine with cross-head speed of 0.05 in/minute in accordance with ASTM D-790. The samples measured 635 cm xp0 1.27 cm × 3.18

Although the invention has been described in detail in the foregoing for the purpose of illustration, it is to be understood that such detail is solely for that purpose and that variations can be made therein by those skilled in the art without departing from the spirit and scope of the invention except as it amy be limited by the claims.

What is claimed is:

1. A thermoplastic molding composition comprising a resinous blend of
   (i) 20 to 50 percent of an acrylate-styrene-acrylonitrile interpolymer,
   (ii) 2 to 10 percent of a first copolymer having a weight average molecular weight of 60,000 to 180,000 g/mole containing structural units derived from styrene, (meth) acrylonitrile and maleic anhydride, and
   (iii) 20 to 80 percent by weight of polyamide, (iv) 0 to 40 percent by weight of a second copolymer having a weight average molecular weight of 70,000 to 200,000 g/mole, the structure of which contains units derived solely from styrene and (meth)acrylonitrile, the percents being relative to the weight of said blend, and 5 to 50 percent relative to the weight of the molding composition of a filler component containing milled glass fibers having an average length of about 1/64" to 1/16" the structural units derived from (meth)acrylonitrile contained in said first copolymer amounting to 10 to 50 percent relative to the weight of said first copolymer.

2. The thermoplastic molding composition of claim 1 wherein filler further contains a positive amount of up to 25 percent, relative to the weight of the molding composition of wollastonite in the form of particles having weight average particle length of 20 to 300 microns and median particle diameter of 2 to 20 microns.

3. The thermoplastic molding composition of claim 2 wherein the wollastonite is present in as a positive amount of up to 22 percent, its median diameter is 3 to 10 microns and its length is 30 to 250 microns.

4. The thermoplastic molding composition of claim 1 wherein the acrylate-styrene-acrylonitrile interpolymer is present in an amount of 25 to 45 percent.

5. The thermoplastic molding composition of claim 1 wherein the first copolymer is present in an amount of 4 to 8 percent.

6. The thermoplastic molding composition of claim 1 wherein the first copolymer contains 50 to 90 wt. percent of its structural units derived from styrene, 10 to 50 wt. percent of its structural units derived from (meth)acrylonitrile and 0.2 to 30 wt. percent of its structural units derived from maleic anhydride.

7. The thermoplastic molding composition of claim 1 wherein the polyamide is present in an amount of 25 to 60 percent by weight.

8. The thermoplastic molding composition of claim 1 wherein the filler component contains 20 to 40 percent by weight, relative to the weight of the molding composition, of milled glass fibers.

* * * * *